(12) United States Patent
Stiesdal (10) Patent No.: US 8,258,666 B2
(45) Date of Patent: Sep. 4, 2012

(54) MANUFACTURING OF SEGMENTS WITH SPECIAL END COILS FOR CROSS-SEGMENT CONNECTION

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 255 days.

(21) Appl. No.: 12/687,925

(22) Filed: Jan. 15, 2010

(65) Prior Publication Data

US 2010/0187939 A1    Jul. 29, 2010

(30) Foreign Application Priority Data

Jan. 23, 2009   (EP) ..................... 09000947

(51) Int. Cl.
*H02K 1/00* (2006.01)
*H02K 3/00* (2006.01)
(52) U.S. Cl. ............ 310/179; 310/195; 310/208
(58) Field of Classification Search .......... 310/195, 310/208, 216.008, 216.009, 180, 184, 187, 310/198, 216.007
See application file for complete search history.

(56) References Cited

U.S. PATENT DOCUMENTS

| | | | |
|---|---|---|---|
| 1,255,607 A * | 2/1918 | Hensley | 310/40 R |
| 4,080,724 A * | 3/1978 | Gillette | 29/598 |
| 5,994,814 A * | 11/1999 | Kawabata et al. | 310/216.062 |
| 6,777,850 B2 * | 8/2004 | Harada et al. | 310/254.1 |
| 6,812,610 B2 * | 11/2004 | Kim et al. | 310/184 |
| 6,894,418 B2 * | 5/2005 | Jones et al. | 310/208 |
| 7,285,892 B2 * | 10/2007 | Tsukamoto et al. | 310/216.074 |
| 2004/0041409 A1 | 3/2004 | Gabrys | |
| 2006/0071568 A1 * | 4/2006 | Kimura et al. | 310/156.56 |

FOREIGN PATENT DOCUMENTS

| | | |
|---|---|---|
| DE | 19923925 A1 | 12/2000 |
| WO | WO 0205408 A1 | 1/2002 |
| WO | WO 0215367 A1 | 2/2002 |
| WO | WO 02095222 A1 | 11/2002 |
| WO | WO 03012292 A1 | 2/2003 |

\* cited by examiner

*Primary Examiner* — Quyen Leung
*Assistant Examiner* — Thomas Truong (57) ABSTRACT

A stator segment for a stator of a ring generator is provided. The stator segment includes a base element and a coil element attached to the base element. The base element includes a connection region, wherein the connection region is adapted for attaching a connecting coil element which connects the stator segment to a further stator segment.

5 Claims, 6 Drawing Sheets

MANUFACTURING OF SEGMENTS WITH SPECIAL END COILS FOR CROSS-SEGMENT CONNECTION

CROSS REFERENCE TO RELATED APPLICATIONS

This application claims priority of European Patent Office application No. 09000947.3 EP filed Jan. 23, 2009, which is incorporated by reference herein in its entirety.

FIELD OF INVENTION

The present invention relates to a stator segment for a stator of a ring generator, a stator device and a stator of a ring generator. Moreover, the present invention relates to a method of producing a stator segment of a stator for a ring generator.

ART BACKGROUND

In wind turbines the wind energy may be transferred into electrical power by ring generators. The ring generators comprise a rotor and a stator in which a rotor shaft is supported pivotably. To the rotor shaft the rotor blades of the wind turbine are attached, so that the wind energy rotates the rotor shaft and thus generates electrical power in the stator by electromagnetic induction.

In conventional wind turbines, the rotational speed of the rotor blade and thus of the rotor shaft is very slow. Thus, in conventional wind turbines gearboxes may be provided in order to provide a higher rotational speed of the rotor shaft inside the stator for providing an efficient power generation.

On the other side, the use of a gearbox may lead to a loss of efficiency due to a resistance of the gearbox. Thus, in modern wind turbines, the diameter of the stator is formed very large, so that the contact area between the inductive elements of the rotor and the coils of the stator may be spaced from the rotary axis of the rotor shaft. Thus, even when the rotor shaft rotates slowly, the relative velocity in the contact area between the rotor and the stator is increased. This leads in wind turbines to large diameters of the stators of the ring generators that have to be transported from the place of production to the place of installation.

SUMMARY OF THE INVENTION

It may be an object of the present invention to provide a proper stator for a ring generator.

In order to achieve the object defined above, a stator segment for a stator of a ring generator, a stator device and a stator for a ring generator as well as a method of producing a stator segment of a stator for a ring generator according to the independent claims are provided.

According to a first exemplary embodiment of the present invention, a stator segment for a stator of a ring generator is provided. The stator segment comprises a base element and a coil element being attached to the base element. The base element comprises a connection region. The connection region is adapted for attaching a connecting coil element for connecting the stator segment to a further stator segment.

According to a further exemplary embodiment, a stator device comprises the stator segment and the connecting coil element. The connecting coil element comprises a fixable region and an adjustable region. The fixable region of the connecting coil element is fixed to the connection region of the stator segment. The adjustable region is adjusted to a further connection region of the further stator segment, so that the adjustable region is attachable to the connection region of the further stator segment.

According to a further exemplary embodiment, a stator for a ring generator is provided. The stator comprises at least one of the above-described stator devices and at least one of the above-described stator segments. The stator device and the stator segment are connected by the connecting coil element attached to the connection region of the stator device and the connection region of the stator segment.

According to a further exemplary embodiment, a method of producing a stator segment of a stator for a ring generator is provided. A coil element is attached to a base element. A connection region of the base element is formed in such a way that the connecting coil element for connecting the stator segment to a further stator segment is attachable.

Under the term "base element", a plane or a ring-shaped part of a segment of a stator may be denoted, wherein the base element may consist of a rigid material, such as laminated material or metal, for instance. The base element may be formed in a lightweight construction in order to reduce the overall weight of the ring generator.

Under the term "coil element" a conductor or a plurality of conductors may be denoted, wherein each of the conductor forms a closed loop, so that by a rotation of the rotor inside of the stator electrical power may be formed due to electromagnetic induction (Lorentz force). The coil element may consist of the single conductors that are interposed into laminates, such as resin, for providing a good isolation and impact protection. This may be done by resin rich technology.

The term "connecting coil element" may denote an above described coil element, in particular at least one conductor forming a loop, that is interposed between two stator segments. The connecting coil element is rigidly attached to at least one of the stator segments.

In conventional wind turbines, ring generator stators are applied that comprise large diameters. In the majority of cases, the stators have to be divided into stator parts in order to transport the stator parts separately. The stator parts have to be assembled at the place of operation. Next, when the stator parts are assembled together, conductors are attached to a surface of the stator part, so that each of the conductors may form a respective stator coil. Thus, in situ, i.e. at the operational area of the stator, time-consuming installation works of these stator parts have to be accomplished. I.e., after assembling the stator parts together in conventional stators, the so-called coil work had to be done including a time-consuming soldering and bracing of the conductors of the coils. Furthermore, when the soldering and the bracing of the conductors (i.e. the free copper ends) are finished, an impregnation process after the soldering work has to be accomplished that also leads to an increase of the installation work of the finished stator at the place of application.

With the present invention, stator segments and stator devices for a stator are provided that comprise a base element including already pre-assembled coil elements. I.e. a coil element is attached to the stator segment in such a way, that the coil element comprises already all necessary connections and interfaces and comprises already the predefined and pre-determined shape. Moreover, in order to provide an interconnection of the stator segments, the stator segments comprise a connection region which is adapted for receiving and for attaching a connecting coil element. This means, that a connecting coil element is attachable to a connection region at the base element of a stator segment. This connecting coil element may be attached to the connecting region in such a way that one part of the connecting coil element is fixed with its fixable region to the connection region and wherein the connecting coil element comprises the adjustable region that is adjusted to the connection region of the further stator segment. Thus, the stator segment (or the stator device comprising the connecting coil element) may be pre-assembled at the place of manufacture and then at the place of operation connected to the further stator segment with only a few additional coil work. In other words, the connecting coil element may form an overhang region with its adjusted region, wherein the overhang region may be attached to a further attachable stator segment of the rotor in an incomplex and rapid manner.

Thus, with the present invention, a construction kit of a plurality of stator segments and stator devices may be provided, wherein each stator segment or device may be attached at the place of operation in an easy and fast way without needing time-consuming installation works, such as bracing or soldering. Each of the stator segments and stator devices form an independent and individual element. Thus, stators for ring generators may be provided with large diameters without providing insuperable problems during transportation or at the place of installation of the ring generator.

According to a further exemplary embodiment, the base element comprises a winding slot to which the coil element is attached. The winding slot may be formed in a side of the base element, e.g. by milling. Inside of the winding slots (winding groove) the coil elements may be inserted. Thus, the shape of the coil elements may be defined by the shape of the winding slots. Furthermore, inside of the winding slots, the coil elements are safely installed, i.e. the coil elements may be protected from external impacts, for instance.

According to a further exemplary embodiment, the connection region comprises a connection slot adapted for receiving the connecting coil element.

According to a further exemplary embodiment, the connection region comprises a plurality of connection slots adapted for receiving a plurality of connecting coil elements. The connection slots may form grooves or slots in the connection region of the base element for receiving the connecting coil element. Thus, the overhanging adjustable region of the further connecting coil element may be hanged up or hinged into the connection slot of the stator segment. Thus, the connecting coil element is rigidly fixed to the stator segment in a predetermined position and shape, defined by the shape of the connection slots. Thus, further assembly work, such as aligning and adjusting of the shape of the connection slots and further electrical connections of the connection slots during the assembly procedure at the place of operation, may be obsolete. Additionally, more than one connection slots may be provided, so that a further stator segment with more than one connecting coil element may be attached to the stator segment.

According to a further exemplary embodiment, the base plate comprises a plurality of connection regions. On each side of the base element a connection region may be formed, so that to each side a further stator segment may be attached. Thus, for instance a stator segment may be formed that comprises connection regions with connection slots, wherein at each side different connecting coils from different stator segments may be attached to. In other words, a stator segment may provide a female connector. A stator segment formed as a female connector may be formed easier than a stator device including a connecting coil, so that the manufacturing time of the stator segment may be reduced.

According to a further exemplary embodiment, a stator device comprises a plurality of connecting coil elements. The respective fixable regions of the plurality of connecting coil elements are fixed to the connection region of the stator segment. The respective adjustable regions of the plurality of connecting coil elements are adjusted to a further connection region of the further stator segments, so that the adjustable regions are attachable to the connection region of the further stator segment. With the present exemplary embodiment, a plurality of connecting coil elements may overlap over a gap between a stator device and a stator segment, for instance. Thus, by overlapping the gap, a more efficient transformation from mechanical rotation into electrical power may be provided.

According to a further exemplary embodiment, the stator device comprises a further coil element. The coil element and the further coil element are arranged in such a manner, that an overlapping region is formed with which the coil element overlaps the further coil element. Thus, when overlapping the coil elements and/or the connecting coil elements, an improved efficiency of the stator may be provided. Furthermore, the diameters of the coil element loops may be increased, because the coil element loops are not restricted to be placed in adjacent winding slots but may also be placed in spaced winding slots. Thus, a proper efficiency may be provided.

According to a further exemplary embodiment of the method, the connecting coil element is attached with a fixable region to the connection region. An adjustable region of the connecting coil element is adjusted to a further connection region of a further stator segment, so that the adjustable region is attachable to the connection region of the further stator segment. When adjusting the adjustable region of the connecting coil already during the manufacturing process, a further adjustment of the connecting coil when assembling the stator segment and the further stator segment is not longer necessary. I.e. the adjustable region of the connecting coil element may be for instance attached to a further stator segment at the place of operation of the generator by hanging the connecting coil in an easy way to a further connection region of a further stator segment. Thus, an easy and fast mounting method of a plurality of stator segments at the place of installation may be provided.

According to a further exemplary embodiment of the present invention, the step of adjusting the adjustable section of the connecting coil element comprises the step of attaching a dummy segment with a dummy connection region to the stator segment. The adjustable region of the connecting coil element is attached to the dummy connection region. The adjustable region of the connecting coil element is adjusted to the dummy connection region, wherein the dummy connection region comprises the same geometrical dimensions as the further connection region of the further stator segment. By the present exemplary embodiment of the method, a dummy segment with a dummy connection region may be applied, wherein the dummy segment acts as a template during the adjusting process of the connecting coil element, so that an exactly dimensioned connecting coil element may be produced at the place of manufacturing. Thus, it may not be necessary to connect two stator segments together during the fabrication process in order to align and to adjust the adjustable region of the connecting coil element. Thus, the production costs and the place may be reduced.

According to a further exemplary embodiment, the connection region is adjusted to a tool element having the same geometrical dimensions as at least a part of the connecting coil element. Thus, by applying the tool element, the connection regions, for instance the connection slots, may be adjusted to predefined shapes of the adjustable regions of the connecting coil element in an easy an inexpensive manner.

In order to remove the tool element and the dummy segment after forming the connection region and the connecting coil, the dummy segment as well as the tool element may comprise materials such as steel covered with Teflon, polypropylene or other materials that provides non-stick properties relative to the impregnation material.

According to a further exemplary embodiment, the stator segment with the adjusted connecting coil element is impregnated, so that an adjusted shape of the adjusted connecting coil is fixed. By impregnating the stator segment the stator segment and the adjusted connecting coil element may be protected against external impacts. Furthermore, the adjusted shape of the connecting coil element may be fixed by the impregnation material, so that a deformation of the adjusted connecting coil element, for instance during transportation, may be prevented.

By the present invention, ring generators comprising stators with large diameters may be build by a plurality of stator segments and stator devices. The stator segments may be pre-assembled with e.g. the coil elements, wherein the assembly of the stator segments at the operation area may be easy without major manual work. Therefore, the coils are preassembled into a base plate (e.g. laminated segments) of the stator segments and fixed to in a pre-defined position. For improving the electromagnetically effect of the stator, at least one connecting coil element bridges the gap between the two stator segments in an assembled state.

With the present invention, each individual stator segment may be processed and fabricated as a complete independent sub-component of the stator.

To provide the desired length and form of the connecting coil element at the adjustable region of the connecting coil element, next to the stator segment a temporary attached dummy segment may be attached temporarily during the manufacturing process to the stator segment. The temporary dummy segment may comprise the same shape as the further stator segment. Thus, the dummy segment may comprise for instance at least one gap that comprises similar geometrical dimensions than the further stator segment. The connecting coils may then be placed into the connection region of the dummy segment and the stator segment and may be adjusted.

After completion of the attachment of the coil elements and the forming of the connecting coil elements, i.e. after completion of the winding, all bracings and soldering may be completed. Then the stator segment may be impregnated. After completion of the impregnation, e.g. via vacuum pressure impregnation VPI, the shape of the coil element and the connecting coil element may be fixed and the temporary dummy segment and tool element may be removed from the stator segment.

Finally, the stator segment provides all necessary coil elements and/or connecting coil elements in a pre-mounted state. When comprising the connecting coil element, the adjustable region of the connecting coil element provides furthermore the proper length and form. Due to the impregnation, the connecting coil element and the coil elements are also sealed.

When inserting the tool element to the connection region, for instance into a connection slot, the tool element will be removed after the sealing process or after the impregnation process, so that the gap respectively the connection slot are completely empty and not soiled with the impregnating material. Furthermore, for providing a protection of the slots, the tool element may be attached during the whole transportation process of the stator segment.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawings are schematically. It is noted that in different figures, similar or identical elements are provided with the same reference signs.

Figure 1:
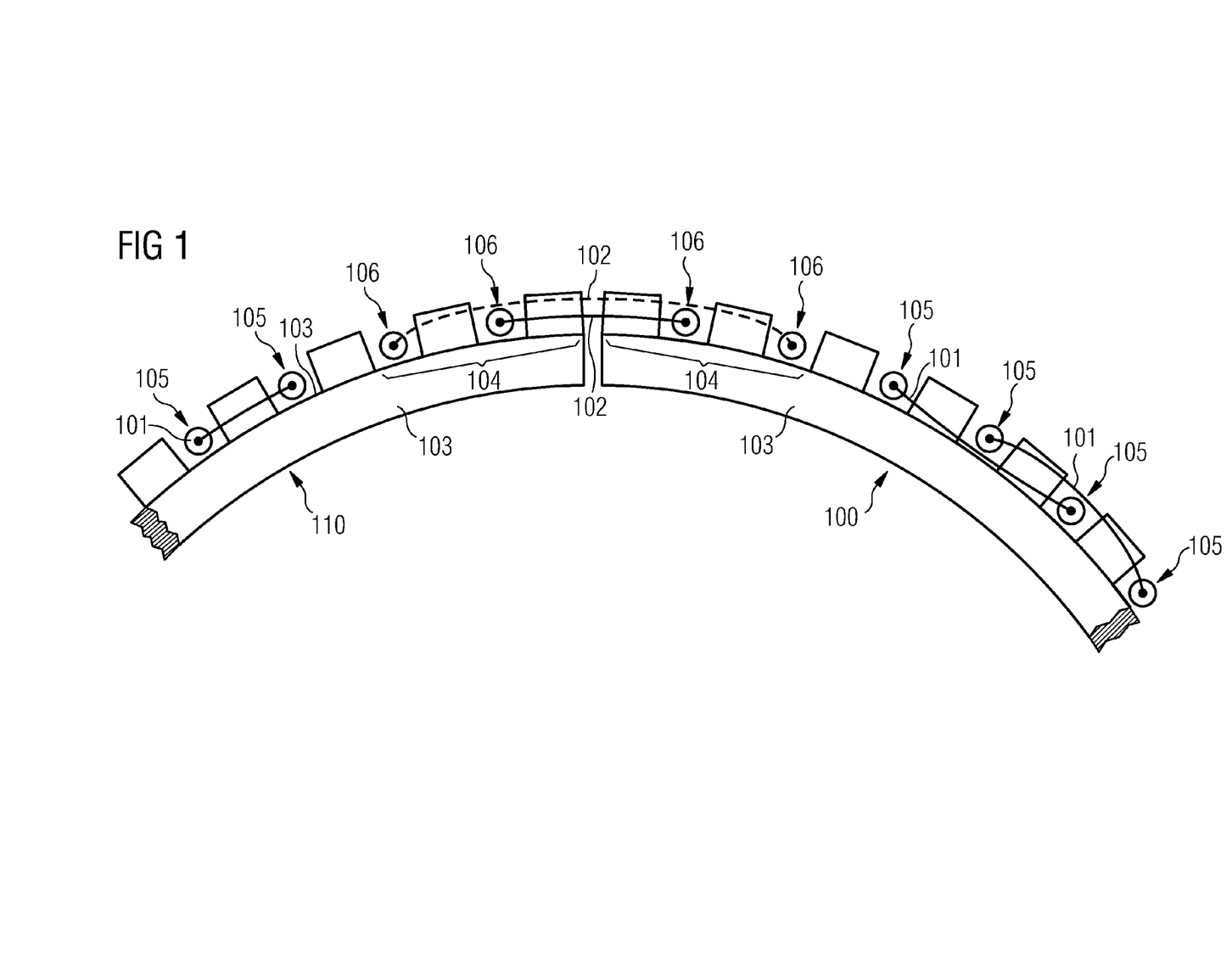
FIG. 1 illustrates a schematic view of a cross section of a stator segment and a further stator segment according to an exemplary embodiment of the present invention.

FIG. 1 illustrates a stator segment 100 for a stator of a ring generator. The stator segment 100 comprises a base element 103 and a coil element 101 being attached to the base element 103. The base element 103 comprises a connection region 104. The connection region 104 is adapted for connecting a connecting coil element 102 for connecting the stator segment 100 to a further stator segment 110.

In FIG. 1, the coil elements 101 and the connecting coil elements 102 are connected to an outer side of the base element 103. In another exemplary embodiment of the present invention the coil elements 101 and the connecting coil elements 102 may also be attached to an inner side (inner surface, e.g. directed to the rotary shaft) of the base element 103. The base element 103 may comprise winding slots 105 and in the region of the connection region 104 connection slots 106. To the winding slots 105 and to the connection slots 106 the coil elements 101 and the connecting coil elements 102 may be attached to. Between the stator segment 100 and the further stator segment 110, the connecting coil elements 102 are attached to the connection regions 104 and the further connection regions 104. Thus, the gap between the stator segment 101 and the further stator segment 110 are bridged by the connecting coil elements 102 in order to provide a proper electromechanical characteristic.

Figure 2:
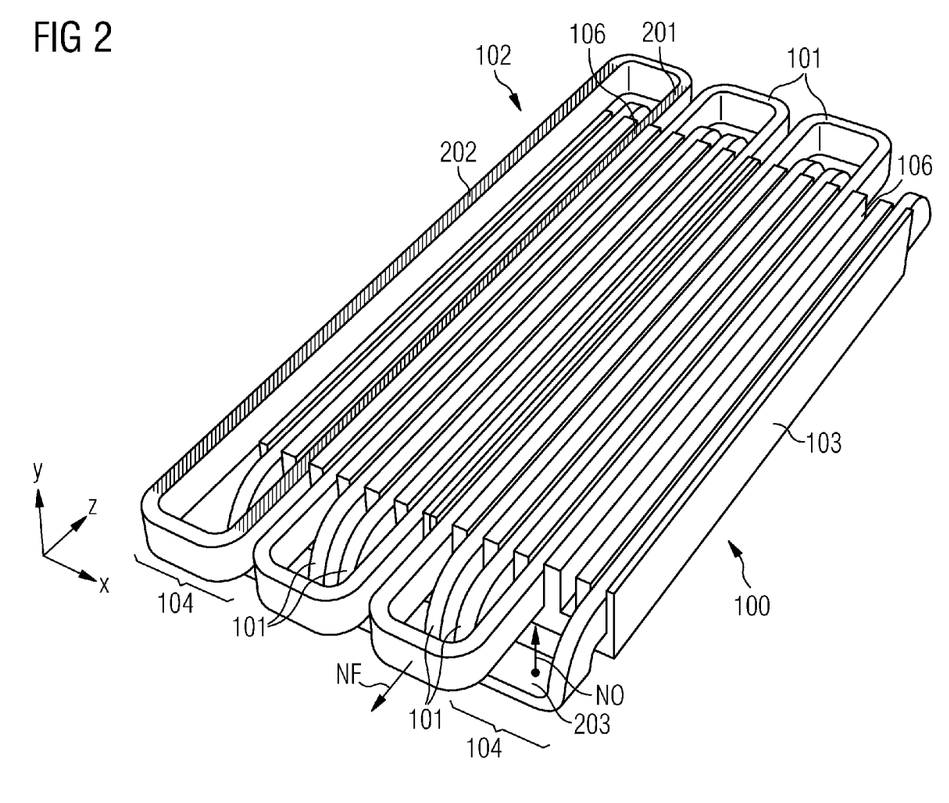
FIG. 2 illustrates a perspective view of a stator segment according to an exemplary embodiment.

FIG. 2 illustrates a perspective view of a stator segment 100. To one side of the base element (base plate) 103, the winding slots 105 and the connection slots 106 are provided. Inside of the winding slots 105 the coil elements 101 are attached to. In the border area of the stator segment 100 two connection regions 104 are formed. The connection regions 104 are located along an x-axis of the stator element 100, so that along the x-axis further stator segments 110 may be attached to.

Furthermore, FIG. 2 illustrates a plurality of coil elements 101 and at least one connecting coil element 102. The connecting coil element 102 and the coil elements 101 are attached to the base element 103, in particular to the winding slots 105 and the connection slots 106, so that they overlap each other in an overlapping region. In this overlapping region 203 one of the coil elements 101, 102 forms an overlapping plane with an overlapping normal (NO), wherein the overlapping normal (NO) extends perpendicular to a normal of a plane of the further coil elements 101, 102 (NF).

The connection region 104 at the left side according to FIG. 2 a connecting coil element 102 is attached to. The connecting coil element 102 comprises a fixable region 201 that is attached to the connection region 104, i.e. to the connection slot 106. Moreover, the connecting coil element 102 provides an overhanging region that hangs over the base element 103, i.e. the connecting coil element 102 provides a free loop part. This free loop part faints an adjustable region 202. The adjustable region 202 may be adjusted to a further connection region 104 (e.g. to further connection slots 106) of a further stator segment 110. Thus, the adjustable region 202 is adjusted in its length and formed with respect to a form of the connection slot 106 of the further connection region 104 of the further stator segment 110.

On the right side of the stator segment 100 shown in FIG. 2 a connection region 104 is provided that is adapted for receiving a connecting coil element 102 from a further stator segment 110. Thus, the right side connection region 104 shown in FIG. 2 provides a free connection slot 106 to which the connecting coil element 102 of the further stator segment 110 may be attached to.

Hence, due to an adjustment of the adjustable region 202 of the connecting coil element 102, the adjustable region 202 of the further connecting coil element 102 of the further stator segment 110 may fit exactly into the connection region 104 (e.g. into the connection slot 106) of the shown stator segment 100.

Figure 3:
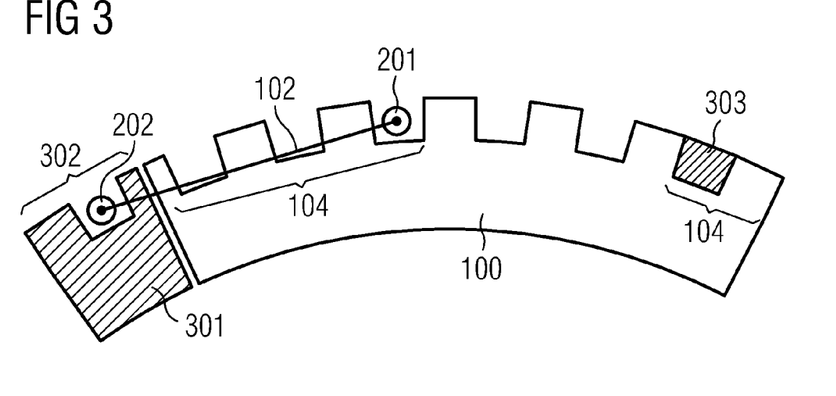
FIG. 3 illustrates a stator segment during a fabrication process according to an exemplary embodiment of the present invention.

FIG. 3 illustrates a stator segment 100 at the fabrication site respectively during the manufacturing process. To the connection region 104 of the stator segment 100 a dummy segment 301 is attached, wherein the dummy segment 301 comprises equal geometrical dimensions as a further stator segment 110. The dummy segment 301 further comprises a dummy connection region 302. The dummy connection region 302 may comprise for instance dummy connection slots, wherein the dummy connection slots may comprise the same geometrical dimensions as the connection slots 106. Thus, during the fabrication process of the stator segment 100, a connecting coil element 102 may be attached with its fixable region 201. The adjustable region 202 of the connecting coil element 102 may be interposed into the dummy connection region 302 and aligned and adjusted to a desired length and form. In other words, a conductor forming the coil may be winded from the connection region 104 of the stator segment 100 to the dummy connection region 302 of the dummy segment 301. When the correct length and form is adjusted, the conductors of the connecting coil element 102 may be sealed, soldered and/or braced, so that the connecting coil element 102 provides the desired dimensions.

Furthermore, in FIG. 3 a tool element 303 is shown. The tool element 303 may provide the same geometrical dimensions as at least a portion of the connecting coil element 102, e.g. as the adjustable region 202 of the connecting coil element 102. Thus, the winding slots 105 and the connecting slots 106 (connection region 104) may be formed due to the dimensions of the tool element 303. Thus, an exact fabrication of the winding slots 105 and connection slots 106 may be provided without the need of attaching a complete further stator segment 110.

The dummy segment 301 and the tool element 303 may be kept attached, until an impregnation of the finished stator segment 100 is applied. Later on, the dummy segment 301 and the tool element 303 may be removed and may be used for a further stator segment 110 that has to be produced.

Figure 4:
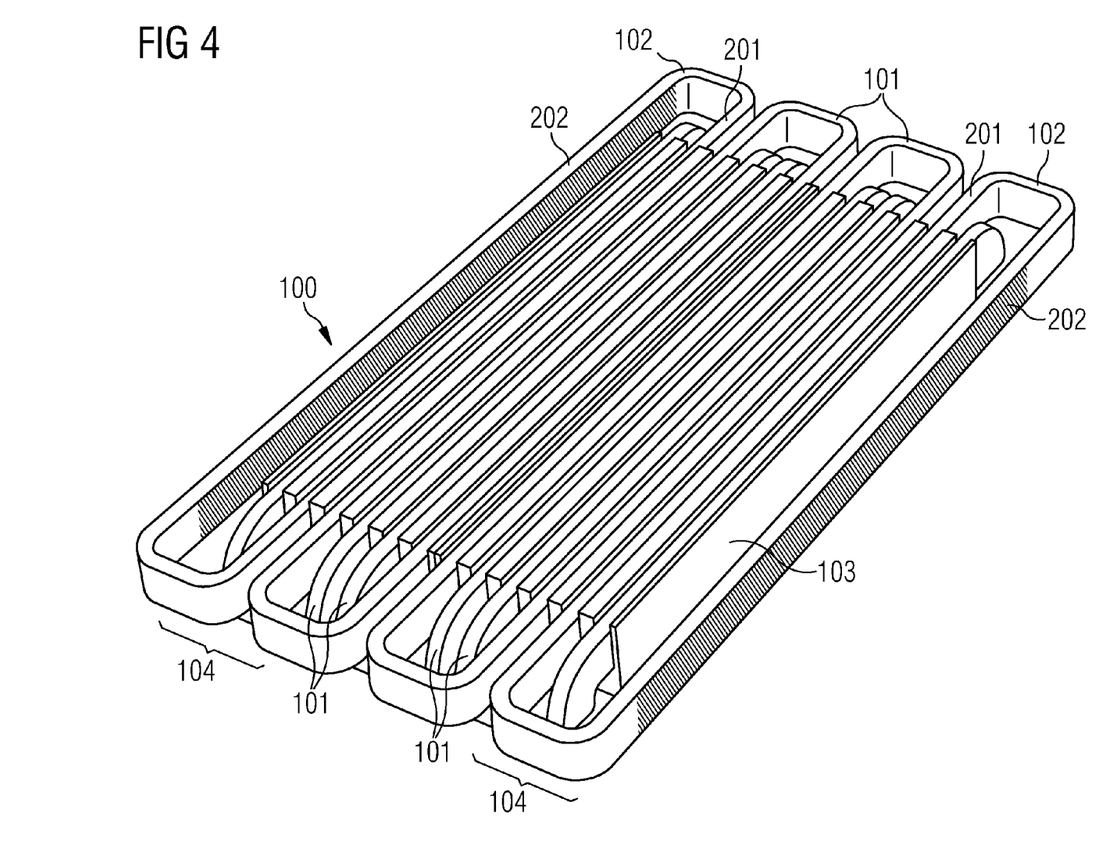
FIG. 4 illustrates a perspective view of a stator segment in a male connector type according to an exemplary embodiment of the invention.

FIG. 4 illustrates a perspective view of the stator segment 100, in particular the stator device, that comprises two connection regions 104. To each connection region 104 a connecting coil element, each having adjustable regions 202, may be attached. Thus, the exemplary embodiment of the stator segment 100 shown in FIG. 4 forms a kind of a "male connector" to which further stator segments 101 comprising e.g. connection slots 106 may be attached.

FIG. 4 illustrates that each connection region 104 comprises one connecting coil element 102. In addition, each connection region 104 may comprise more than one connecting coil elements 102. In particular each connection region 104 may comprise 2, 3, 4 or more connecting coil elements 102.

Figure 5:
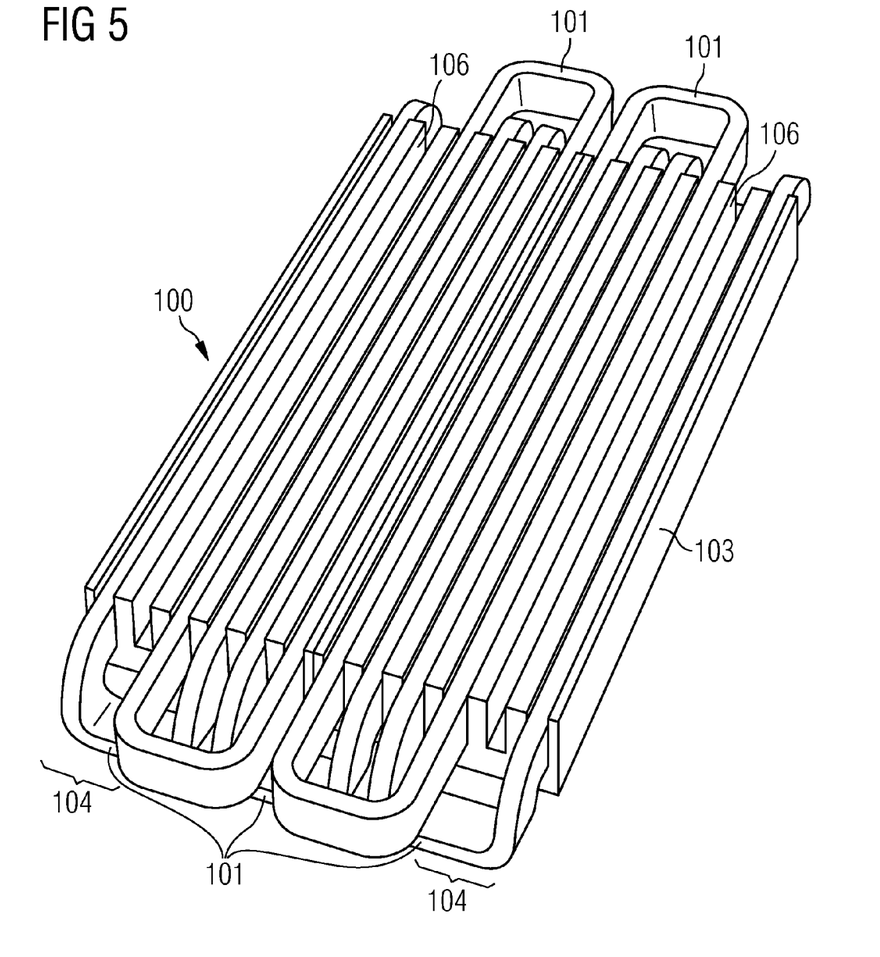
FIG. 5 illustrates a perspective view of a stator segment of a female connector type according to an exemplary embodiment of the invention.

FIG. 5 illustrates a stator segment 100 according to a further exemplary embodiment of the invention, wherein two connection regions 104 are shown. Each of the connection regions is adapted for attaching (receiving) the connecting coil element 102 respectively the adjustable region 202 of the connecting coil element 102 of the further stator segment. The stator segment 100 according to the exemplary embodiment of FIG. 5 comprises after the fabrication process no connecting coil element 102 and may thus form a so-called "female connector". The connection region 204 of the stator element 100 may comprise one connection slot 106 but also a plurality of connection slots 106 such as 2, 3, 4 and more connection slots 106 may be provided. Thus, for each of the plurality of connection slots 106 a further connecting coil element 102 of a further stator segment 110 may be attached to. Thus, for instance three connecting coil elements 102 of a stator segment 100 may be attached with its adjustable regions 202 to three connection slots 106 of the further stator segment 110.

Figure 6:
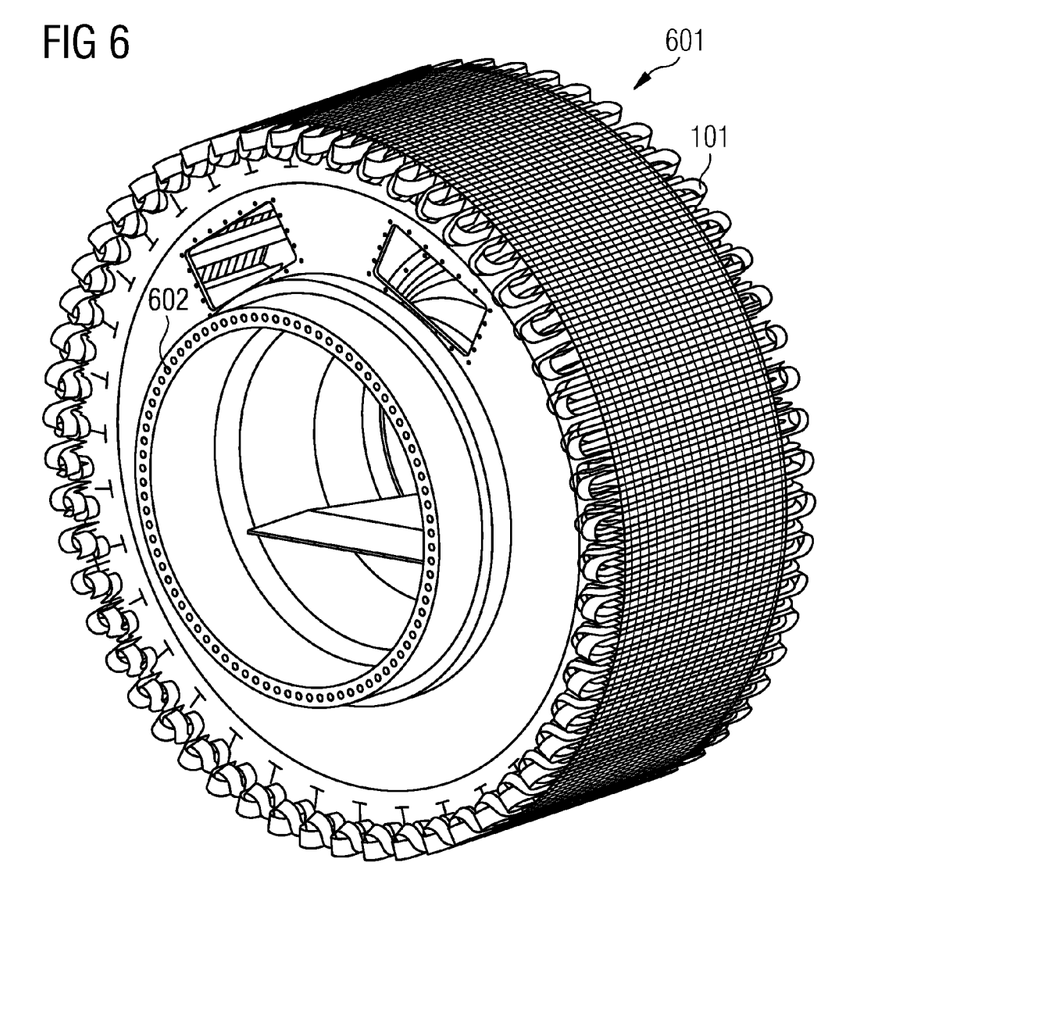
FIG. 6 illustrates a perspective view of a stator of a ring generator.

FIG. 6 shows a perspective view of a ring generator comprising a stator ring 601 and a rotor 602. To the outer surface of the stator ring 601 a plurality of coil elements 101 are attached. When rotating the rotor 602, electrical power may be inducted into the coil elements 101 of the stator ring 601 for generating electricity. The diameter of the stator ring 601 may be large and thus difficult to transport.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:
1. A stator device, comprising:
 a stator segment, comprising:
  a base element, and a coil element attached to the base element within a winding slot of the base element
a further coil element, and
a connecting coil element, comprising:
a fixable region, and
an adjustable region,
wherein the base element comprises a connection region,
wherein the connection region is adapted for rigidly attaching the connecting coil element to the stator segment such that the connecting coil element connects a first stator segment to a second stator segment,
wherein the fixable region of the connecting coil element is fixed to a first connection region of the first stator segment,
wherein the adjustable region is adjusted to a second connection region of a second stator segment, so that the adjustable region is attachable to the second connection region,
wherein the coil element and the further coil element are arranged in such a manner that an overlapping region is formed with which the coil element overlaps the further coil element, and
wherein in the overlapping region the coil element forms an overlapping plane with an overlapping normal so that the overlapping normal extends perpendicular to a normal of a plane of the further coil element,
further comprising a plurality of connecting coil elements,
wherein the respective fixable regions of the plurality of connecting coil elements are fixed to the first connection region, and
wherein the respective adjustable regions of the plurality of connecting coil elements are adjusted in length to the second connection region, so that a plurality of adjustable regions are attachable to the second connection region.

2. A stator for a ring generator of a wind turbine, the stator comprising:
a stator device, comprising:
a first stator segment, comprising:
a first base element,
a first coil element attached to the first base element, and
a further coil element attached to the first base element,
a connecting coil element, comprising,:
a fixable region, and
an adjustable region,
a second stator segment. comprising:
a second base element, and
a second coil element attached to the second base element,
wherein each first base element and second base element comprises a connection region, a first connection region and a second connection region, respectively,
wherein each connection region is adapted for attaching the connecting coil element that connects the first stator segment to the second stator segment,
wherein the fixable region of the connecting coil element is fixed to the first connection region of the first stator segment,
wherein the adjustable region is adjusted to the second connection region of the second stator segment, so that the adjustable region is attachable to the second connection region, and
wherein the first stator segment and the second stator segment are connected by the connecting coil element attached to the first connection region of the stator device and the second connection region of the second stator segment,
wherein each first base element and each second base element further comprises a winding slot within which each first coil element and each second coil element, respectively, is attached,
wherein the coil element and the further coil element are arranged in such a manner that an overlapping region is formed with which the coil element overlaps the further coil element, and
wherein in the overlapping region the coil element forms an overlapping plane with an overlapping normal so that the overlapping normal extends perpendicular to a normal of a plane of the further coil element,
wherein the stator device further comprises a plurality of connecting coil elements,
wherein the respective fixable regions of the plurality of connecting coil elements are fixed to the first connection region, and
wherein the respective adjustable regions of the plurality of connecting coil elements are adjusted in length to the second connection region, so that a plurality of adjustable regions are attachable to the second connection region.

3. The stator as claimed in claim 2, wherein each connection region of the first base element and second base element comprises a connection slot within the respective base element adapted for receiving the connecting coil element.

4. The stator as claimed in claim 3, wherein each connection region further comprises a plurality of connection slots adapted for receiving a plurality of connecting coil elements.

5. The stator as claimed in claim 2, wherein each base element comprises a plurality of connection regions.

* * * * *